July 7, 1964

C. M. McKINNEY 3,140,461

METHOD FOR OBTAINING HIGH RANGE RESOLUTION
WITH CONTINUOUS TRANSMISSION FREQUENCY

Filed March 14, 1961

INVENTOR.
CHESTER M. McKINNEY

BY

*ATTORNEYS*

Fig. 4
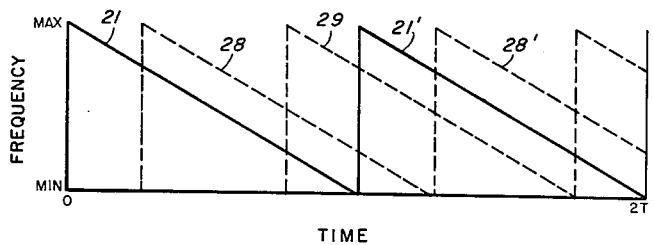
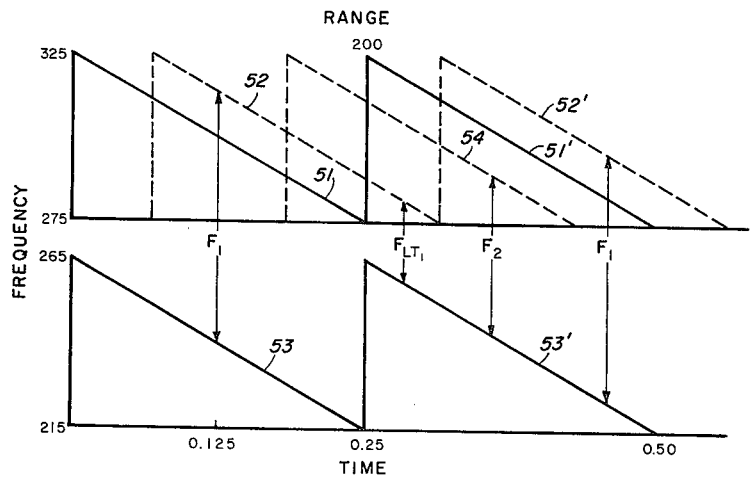
Fig. 6

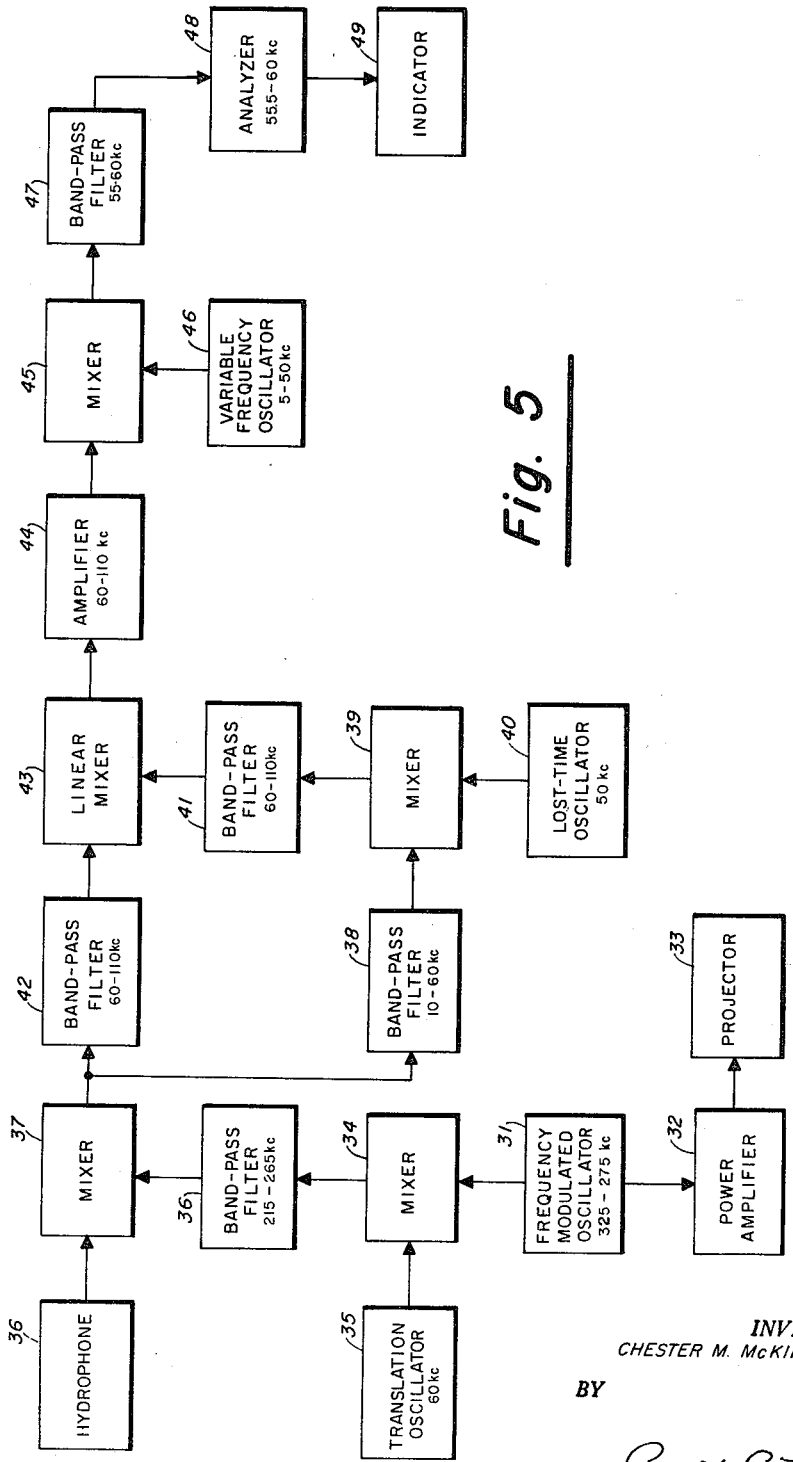

3,140,461
METHOD FOR OBTAINING HIGH RANGE RESOLUTION WITH CONTINUOUS TRANSMISSION FREQUENCY

Chester M. McKinney, Austin, Tex., assignor, by mesne assignments, to the United States of America as represented by the Secretary of the Navy
Filed Mar. 14, 1961, Ser. No. 95,748
4 Claims. (Cl. 340—1)

The present invention relates to a system and method of echo ranging, and more particularly to a sonar system and method of accomplishing high range resolution.

Many of the present sonar systems utilize a continuous transmittal of a frequency modulated wave into a medium wherein the frequency modulated wave is reflected from objects or targets in the medium. The reflected wave may then be heterodyned with the transmitted wave to produce a beat frequency. If the transmitted signal is modulated by a low-frequency linear sawtoothed wave, either symmetrical or asymmetrical, it is apparent that such a beat frequency is a measure of the range of the object or objects from which the transmitted wave was reflected. If several objects at varying distances from a projector reflect the transmitted wave, there will be produced a number of beat frequencies which are simultaneously present, each of which indicates the presence of one particular object or particular objects.

If the objects are close together it may be difficult to determine whether a given echo actually indicates the presence of one or two objects. The measure of the ability to determine whether two targets are separate targets is referred to as range resolution. If by using a sonar set, one can barely distinguish between two targets at a desired range, separate a distance $\Delta R$, as being two distinct targets, the range resolution is referred to as $\Delta R$. To increase range resolution, therefore, usually implies high accuracy in measuring range or distance also.

Theoretically, in utilizing such a system, it is possible to have difference frequencies ranging from zero to the difference in frequency between the maximum and minimum values of the linear saw-toothed wave, however, it is conventional to make use of only a portion of this band of frequencies, say ⅕ to 1/10 of the total. One reason for this is because of the "lost time" factor which may be explained as being the round-trip tranmission time to the target. Thus it can be seen that this "lost time" increases with increasing range and, therefore, it would be desirable if this lost time factor could be eliminated.

In conventional FM sonar the band of difference frequencies is analyzed by a group of band-pass filters of bandwidth $\Delta F$ separated at the center frequencies by $\delta F$. If the number of filters in the analyzer is N, the range resolution is given by $$\Delta R = \frac{R_{max} - R_{min}}{N}$$

The resolution can be increased by increasing N, a large value of $\Delta R$ means a low resolution, but this increases the complexity of the analyzer, and further, for a given value of ($F_{max} - F_{min}$) means a decrease in the band width, $\Delta F$, of each filter. This later factor puts a higher requirement on the Q of the filters and further, because of the response time of the filter, $1/\Delta F$, means that the areal search rate of the sonar system is reduced. Thusly, a further disadvantage of the prior sonar systems is the large number of narrow band filters needed in the analyzer to achieve high range resolution in that this results in complicating the equipment and reducing the search rate of the system.

Therefore, an object of the invention is the provision of a system having high range resolution.

A further object of the invention is to provide a system having high range resolution and a small number of filters in the analyzer.

Another object of the invention is to provide a system having high range resolution and a high areal search rate.

Another object of the invention is to provide a range gate which may be moved toward and away from the hydrophone receiving the reflected signals.

Another object of the invention is to provide a system and method for eliminating signals corresponding to lost time associated with objects in a medium.

Another object of the invention is to provide a method and system for rejecting signals representing ambiguous objects in the medium.

Other objects and many of the attendant advantages will become apparent from the ensuing detailed description.

In general, the purposes and objects of the present invention are accomplished through the use of a continuous transmission frequency modulated system wherein a linear saw-toothed FM signal is radiated into a given medium such as water, continuously, and is reflected from an object or objects in the water. The radiated signal may have either a symmetric or asymmetric saw-toothed wave shape. The reflected waves which return to the receiver after reflection from an object or objects are characterized by a wave the same shape as the wave transmitted displaced from the transmitted wave by an amount proportional to the travel time to and from the object. At any instant, therefore, the transmitted and reflected signal differ in frequency by an amount proportional to the travel time, or the distance to the object, since, the velocity of the signal in the water is constant.

In the present invention the transmitted wave varies periodically with respect to time between a maximum and minimum frequency as do many of the prior sonar systems. High range resolution is accomplished through the utilization of a range gate wherein the effective distance between the transmitting head of the sonar system and the established range gate may be varied by the operator of the sonar system. In establishing the range gate the system is designed so that the range gate covers a very narrow band of frequencies corresponding to a very narrow band of ranges. High range resolution is then attained by analyzing this narrow band of frequencies in a conventional analyzer wherein the narrow band is in effect spread out resulting in a much higher range resolution.

In addition, in the present system lost time associated with the round trip transmission time to objects in the medium is eliminated by subtracting signals representative of lost time from the band of frequencies in the range gate being analyzed at any one time.

The present system and method also effectively removes any possibility of receiving ambiguous signals representing targets or objects which are not at the indicated location by translating a portion of the transmitted signal which is used in the heterodyning process either upwards or downwards in frequency and heterodyning the resultant higher or lower frequency against the received signals.

Through the use of the present invention, range resolution is improved without sacrificing area scan rate and without the use of an increased number of narrow band filters in the analyzer. In addition unwanted signals may be rejected simply and easily while retaining a desired frequency band which is to be analyzed, and lost time is completely eliminated.

The invention is illustrated and described in the accompanying drawings wherein like numerals indicate like elements, wherein:

FIG. 4 is a frequency-time graph illustrating the presence of ambiguous targets and the method of eliminating ambiguous targets;

FIG. 5 is a block diagram of a high resolution continuous transmission frequency modulation sonar of the present invention;

FIG. 6 is a frequency-time graph used in illustrating the embodiment of FIG. 5;

Figure 1:
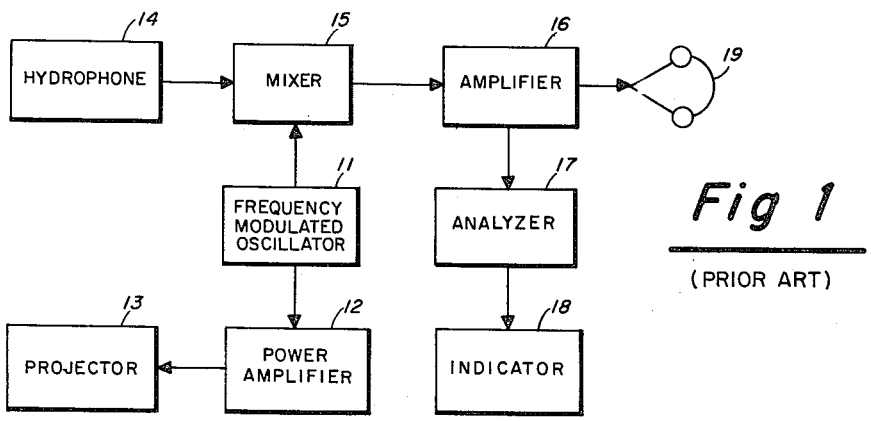
FIG. 1 illustrates the prior art conventional continuous transmission frequency modulated sonar system.

In order to properly understand the operation of the new method and to explain the advantages of the new system, a brief description of the operation of the conventional continuous transmission frequency modulated sonar will be given. FIG. 1 is a block diagram of an existing sonar system wherein a frequency modulated oscillator 11 generates an alternating electrical signal which varies periodically and linearly with time from $f_{max}$ to $f_{min}$. Typically the frequency varies between 48 kc. to 36 kc. giving a total swept band of 12 kilocycles. A power amplifier 12 amplifies the signal before passing it to a projector 13 comprising an electroacoustic transducer whereby a signal is propagated into a given medium, which in the case of sonar, is water.

The projector propagates into the water the frequency modulated signal varying in frequency from $f_{max}$ to $f_{min}$ which will strike objects present in the water and reflect some of the signal energy propagated to a hydrophone 14 comprising another electroacoustic transducer at a time T later. The distance or range from the projector and hydrophone 13 and 14, respectively, to the objects in the medium is given by $$R = \frac{ct}{2}$$

where R is the distance from the transducers to the object, $t$ is the delay time, and $c$ is the velocity of propagation in the given medium and in this instance is 4800 f.p.s.

The reflected signal is one input to a nonlinear mixer 15 while the other input to mixer 15 is a portion of the projected signal generated by the frequency modulated oscillator 11. One of the outputs of the mixer 15 will be a signal whose frequency is the difference between the projected signal and reflected signal and this difference frequency is proportional to the distance to the object. Therefore, the ranges proportional to the receiver frequency and $F_{max}$ corresponds to $R_{max}$ and $F_{min}$ corresponds to $R_{min}$ where $F$=difference frequency and $R$=range. The difference frequency is the input to an amplifier 16 having a bandwidth of approximately two kilocycles wherein the difference frequency is amplified and passed to an analyzer 17 wherein the two kilocycle band of frequencies is analyzed to determine the range to the object in the medium which reflected the signal. The output of the analyzer may be fed into an indicator 18 for visual display as on an oscilloscope, for example. If an aural display as well is desired earphones 19 or other suitable means may be provided at the output of the amplifier 16 for obtaining an audible tone representative of the signals which are in turn representative of objects in the medium.

Even though it is theoretically possible to have difference frequencies ranging from 0 to 12 kc., in the example given, only a band of difference frequencies two kilocycles wide is analyzed and made use of. The other difference frequencies, from 2 kc. to 12 kc., are not made use of. Therefore, in a typical system the bandwidth amplifier 16 which follows the mixer is also only 2 kc., or perhaps slightly greater. Therefore, even though a total bandwidth of 12 kc. is theoretically available is it conventional to make use of only a portion of this band of frequencies, say ⅕ to ⅒ of the total. One reason for utilizing only a portion of the band of frequencies is the "lost time" factor involved in the transmission and reception of signals in a medium. To explain lost time, reference is made to FIG. 2 which shows a graph of projected and received frequencies with respect to time. A solid line 21 represents a projected signal while the dotted lines 22 and 23 represent signals reflected from objects at a maximum and a minimum range of interest, respectively. The vertical distance between the projected signal and any one received signal is representative of the difference frequency F, as shown.

Figure 3:
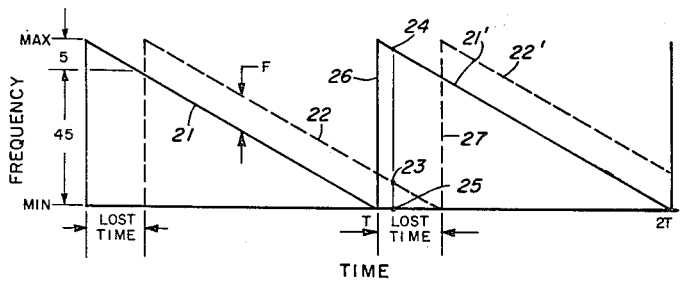
FIG. 3 is a frequency-time graph for a continuous transmission frequency modulated sonar system illustrating lost time.

Reference is now made to FIG. 3 wherein a single received signal is compared to a projected signal to illustrate the phenomena of lost time. In FIG. 3 it can be seen that at the end of one period of the projected signal 21 there is a discontinuity in the difference frequency F and for a time the value of the difference frequency is not F but $(f_{max}-f_{min})-F$. This can be seen by examining the relationship of the projected and received signals after the end of a period T at a point 25 on FIG. 3. Thus, if a line is projected vertically from point 25 so that it intersects reflected signal 22 and transmitted signal 21' of the second period, such a line will intersect the received signal at point 23 and the transmitted signal 21' of the second period at point 24. It is noted that the transmitted signal corresponding to line 21' is exactly the same as signal 21 displaced one period in time. In FIG. 3, the lost time period is represented as the time period between lines 26 and 27. The lost time frequency, $F_{lt}$, equals the difference frequency during the lost time period and during this period equals the transmitted frequency minus the echo frequency or $$(f_{max}-f_{min})-F$$

Therefore, during the lost time period $$F=(f_{max}-f_{min})-F_{lt}$$

The difference frequency F remains at a value corresponding to the lost time frequency $F_{lt}$ until the received or echo signal as represented by lines 22 and 22' has completed one full period, and then the difference signal is again the echo frequency minus the transmitted frequency as can be seen from FIG. 3. The time required for this is $$t = \frac{2R}{c}$$

or is simply the round-trip transmission time to the target. In that line 22 corresponds to an echo frequency which in turn corresponds to a particular object in the medium it is apparent that as the range increases or decreases the lost time increases or decreases correspondingly and thus it can be seen that the lost time increases with increasing range. The maximum value of lost time may be represented by $$LT_{max} = \frac{F_{max}}{(f_{max}-f_{min})}$$

and it is conventional practice to keep this ratio as small as possible in order that the lost time be of no great consideration.

Another reason for keeping F small compared to $(f_{max}-f_{min})$ is to reduce the possibility of having ambiguous targets. Reference is made to FIG. 4 to illustrate the phenomena of ambiguous targets or objects in the medium wherein 21 and 21' represent the transmitted signals, 28 and 28' represent echoes from objects in the medium at a range $R_1$, and 29 represents an echo from range $R_2$. It can be seen from FIG. 4 that at any time after the transmitted signal has gone through more than one complete cycle of period T that a target from range $R_1$ corresponding to 28' and a target at range $R_2$ corresponding to 29 will combine with the transmitted signal to produce identical difference frequencies. This problem is not serious if a real target exists at only one of these ranges but the sonar set is not able to tell which of the two possible ranges is that of the target unless there is some relative motion in a known direction between the sonar system and the target.

Figure 2:
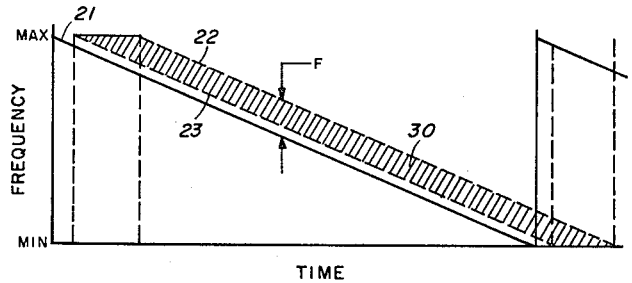
FIG. 2 is a graph of transmitted and received frequencies with respect to time.

Another reason for utilizing only a narrow band of the possible difference frequencies is a desire to obtain relatively high range resolution. In conventional sonar, a band of difference frequencies represented by a cross hatched portion 30 in FIG. 2 is analyzed by the analyzer 18. The analyzer consists of a group of band-pass filters of bandwidth ΔF separated at the center frequencies by δF. If the number of filters in the analyzer is N, the range resolution is given by $$\Delta R = \frac{R_{max} - R_{min}}{N}$$

The resolution can be increased or improved by increasing the number of filters, wherein a large value of ΔR means a low resolution, but increasing the number of filters increases the complexity of the analyzer and further means a decrease in the bandwidth, ΔF of each filter. If the bandwidth of the filter is decreased a higher requirement on the Q of the filters is made and further, means that the areal search rate of the sonar system is reduced because the response time of the individual filter is a reciprocal of the bandwidth of the filter. Therefore, as the bandwidth of the filter decreases the response time increases; conversely, if the bandwidth of the filter increases the response time becomes shorter thereby allowing a faster areal search rate. Therefore, it is undesirable to have a large number of very narrow band-pass filters in order to achieve high resolution.

In a typical sonar system designed for high range resolution operation of the output of the FMO 11 might vary from 275 to 325 kc. thereby producing a swept band of 50 kc. It is reasonable to assume that a band of difference frequencies of 4.5 kc. could be analyzed, with 0.5 kc. being the frequency for minimum range. If the analyzer had a total of 90 filters, which is a practical number, then each filter would have a bandwidth of 50 c.p.s. If the maximum range of interest is 200 yards and a minimum range of interest is 20 yards, then each filter will correspond to a range increment of 2.0 yards or the range resolution is 2.0 yards or about 72 inches. This band of difference frequencies is illustrated in FIG. 2 wherein 22 corresponds to an echo received from a range of 200 yards and 23 corresponds to an echo at range 20 yards. Now, if a resolution of 7.2 inches is required, for the same analyzed band, a total of 900 filters would be required. Further, the bandwidth of each filter would be 5.0 c.p.s. instead of 50 c.p.s. As stated previously the narrow filters are both difficult to construct and in addition, thereto, have a long response time. The response time for the 5.0 c.p.s. filter is ⅕ of a second while the response time of the 50 c.p.s. filter is only ¹⁄₅₀ of a second. The importance of this fact is that if the acoustic beam of the sonar system is moved by rotation or lateral displacement, in order to search an area or volume of a medium, then the system using the 5 c.p.s. filters can be moved at only ¹⁄₁₀ the rate of the 50 c.p.s. filter system.

If a large number of filters were the only objection, then one could use, for example, only 90 filters and examine only ¹⁄₁₀ of the former range band. However, this method would have the disadvantage of analyzing a band only 500 c.p.s. in total bandwidth, which is a comparatively small percentage, i.e., one percent of the total swept band, 50 kc. Thus, 99 percent of the spectrum would be unused.

The block diagram of FIG. 5 represents one system for achieving the high range resolution of the present method. A frequency modulated oscillator 31, operating in the range of 275 kc. to 325 kc., produces a frequency modulated periodically varying signal which is fed into a power amplifier 32 for amplification and then projected into the medium, in this instance water, through a projector 33 which in the present method comprises an electroacoustic transducer. A portion of the frequency modulated signal produced by FMO 31 is introduced into a nonlinear mixer 34. The other input to the nonlinear mixer 34 is the output of a translation oscillator 35 which is designed to produce a frequency of 60 kilocycles. The frequency of the translation oscillator is chosen to preclude the generation of false echoes after the transmitted signal has completed one complete cycle and will be referred to in the operation of the system relative to FIG. 6. The output of mixer 34 is then introduced into a band-pass filter 36 wherein only the frequencies from 215 to 265 kilocycles are passed, thereby rejecting the base frequencies of 60 kc. and the range of 325 to 275 kc. The echo signals reflected from objects in the medium are received on a hydrophone 36, in this case another electroacoustic transducer, and form one input to another nonlinear mixer 37. The other input to mixer 37 is the output of band-pass filter 36; thereby producing in the output of the mixer a difference frequency or a band of difference frequencies which encompasses the 50 kc. difference between the original 275–325 signal projected into the water. The output of mixer 37 is then sepparated and one output goes to a band-pass filter 38 which is designed to pass a range of frequencies encompassing 10 to 60 kc. This range of frequencies in this embodiment comprises the frequencies representing the lost time frequency, $F_{lt}$, during the lost time period previously referred to. The output of band-pass filter 38 represents one input to a nonlinear mixer 39; the other of which input is produced by a lost time oscillator 40 which generates frequency the same as the width of the swept band of the FMO or 50 kilocycles. The output of mixer 39 is then introduced into a band-pass filter 41 which is designed to pass a range of frequencies from 60 to 110 kilocycles.

The other output of mixer 37 is introduced into a band-pass filter 42 which is also designed to pass a range of frequencies from 60 to 110 kc., which as can be seen is the 50 kc. difference which is the width of the swept band of the FMO 11. The outputs of band-pass filters 42 and 41, respectively, are introduced into a linear mixer 43, wherein it is desired that two signals be mixed in such a fashion that no difference frequencies result. This could be accomplished by utilizing, for example, a dual-triode wherein the input signals are connected to separate grids and wherein the two plates are connected to a common load resistance. This is the same type operation used, for example, in mixing two microphone inputs in a common analyzer. By this means the signal representative of lost time is effectively eliminated thereby effectively eliminating the phenomena of lost time.

The output of the linear mixer 43 is then introduced into an amplifier 44 designed to amplify a band of frequencies from 60 to 110 kc. The output of amplifier 44 then comprises one input to a nonlinear mixer 45 wherein the other input comprises the output of a variable frequency oscillator 46 designed to produce a range of signals from 5 to 50 kc. Through the use of the VFO 46 a range gate is established which may be moved in distance from the hydrophone at the will of the operator, i.e., the narrow band of frequencies desired to be analyzed at any time may be chosen at any distance from the hydrophone. The output of mixer 45 is then introduced into a final band-pass filter 47 designed to pass a range of frequencies from 55 to 60 kilocycles. The output of band-pass filter 47 forms the input to analyzer 48 designed to analyze the range of frequencies from 55.5 to 60 kilocycles, that is to say, 0.5 kilocycle and the output of the analyzer may form the input to any desired indicator 49 such as an oscilloscope or a set of headphones, for an aural or visual display.

FIG. 6 is a plot of transmitted and echo frequencies received vs. time and will be referred to in explaining the block diagram of FIG. 5. Assume that one is interested in observing targets at a maximum range of 200 yards. The sonar system sweeps from 325 to 275 kc. and the analyzer 48 is composed of 90 discreet filters, each having a bandwidth of 50 c.p.s., analyzing a total band-pass from 55.5 to 60 kilocycles. For conventional sonar operation the period of the transmitted signal would be 2.5 seconds for a velocity of sound in water of 4800 feet per second. With these parameters the minimum range is 20 yards while the maximum range is 200 yards and range resolution or range increment examined in each filter of the analyzer is 2.0 yards.

In the operation of the new method the period T is reduced by a factor of 10 to 0.25 seconds which is the round trip transit time for a range of 200 yards. Therefore, a difference frequency of 50 kilocycles corresponds to a range of 200 yards. With the VFO oscillator 46 set at 50 kilocycles, the analyzer uses original difference frequencies from 500 c.p.s. to 5000 c.p.s., which corresponds to ranges from 2 yards to 20 yards, and with a 90 channel analyzer the resolution, i.e., range increment per filter, is 0.2 yard or 7.2 inches. This increase in resolution has been gained at the expense of reducing the band of ranges analyzed at a given time; in the original operation it was 180 yards while with the new system it is 18 yards. As the frequency of the VFO 46 is increased, the 18-yard range band or gate is moved outward until finally, when the VFO frequency is 50 kilocycles, the range gate is from 182 yards to 200 yards. By means of band-pass filter 47 the difference between the VFO frequency and the input frequency to the mixer 45 is selected from the various output signals of mixer 45. For further clarification a set of conditions will be assumed and signals traced through the system.

Let us assume a set of conditions where it is desired to examine the band of ranges 0 to 20 yards. Under this set of conditions the output of FMO 31 would range from 325 kilocycles to 275 kilocycles as indicated at 51 and 51′ in FIG. 6. This output would then be amplified in the power amplifier 32 and propagated into the water through the projector 33. The translation oscillator is set at 60 kilocycles which is a fixed frequency in this embodiment. The frequency of 60 kilocycles is chosen so that any possibility of ambiguous targets is negated. It can be shown that a frequency of 50 kc. or less would produce or not eliminate ambiguous targets.

The original frequencies from the FMO and the translation oscillator are mixed in the mixer 34 and through the use of the band-pass filter 36 a range of frequencies from 265 to 215 kilocycles comprises one input to mixer 37. The other input to mixer 37 comprises reflected signals received on hydrophone 36, thereby producing a range of difference frequencies from 60 to 110 kc. in the output of the mixer. In FIG. 6, lines 52 and 52′ correspond to an echo received from a range of 20 yards. The difference frequency in the output of mixer 37 for a range of 20 yards would be 65 kc. This 65 kc. signal is fed through the linear mixer 43 into the amplifier 44 and into mixer 45. It must be remembered that the signal corresponding to the range of 20 yards is only one of many signals that may be present and that actually there may be a range of signals from 60 to 110 kc., however, the range of 0 to 20 yards is the range gate that is desired to be examined at this time. This fixing of the range gate is accomplished through the use of the VFO 46 wherein the VFO is set to produce a signal of 5 kc. This 5 kilocycle signal is one input to mixer 45 and is beat against the 65 kc. frequency representing an object at 20 yards. The output of mixer 45 will be a 60 kc. difference signal and will be passed by band-pass filter 47 to the analyzer 48 wherein it will show on the indicator 49 as an object at a range of 20 yards. Now, by examining FIG. 6 it can be seen that during the lost time period the lost time frequency at the output of mixer 37 will be 15 kilocycles and by examining FIG. 5 it is seen that band-pass filter 42 has been designed to pass only the signals from 60 to 110 kc. but that band-pass filter 38 is designed to pass frequencies from 10 to 60 kilocycles. Therefore, the 15 kilocycle signal representing the lost time frequency will be introduced into mixer 39 and will be heterodyned with the output of lost time oscillator 40 which produces a signal of 50 kilocycles. Therefore, in the output of mixer 39 will be signals corresponding to the originals, sum and difference, i.e., 65 kc., 50 kc., 35 kc., and 15 kc. Band-pass filter 41 is designed again to pass frequencies from 60 to 110 kc. therefore the 65 kc. signal will be passed and introduced as one input to the linear mixer 43 thereby, in effect, eliminating lost time completely. This 65 kilocycle signal then progresses through the system in the same manner as before, i.e., through the amplifier 44, through mixer 45 where it is mixed with the 5 kilocycle VFO signal, then to band-pass filter 47 and from there to the analyzer and then to the indicator 49. FIG. 6 also may be used to illustrate the reason why the translation oscillator is utilized and why a frequency greater than the difference between the width of the swept band of FMO 31 is used. In FIG. 6, therefore, 53 and 53′ represent a translated signal which constitutes one input to mixer 37 and 54 indicates an ambiguous target or a target which lay at a range of 180 yards from the transducer. Now by translating downwards in frequency, the original FMO frequency, by a factor of 60 kc., it is apparent from FIG. 6 that only the signals representing the range of 0 to 20 yards are passed by band-pass filter 42; thereby eliminating any signals produced by beating against the transmitted signal of the second period an echo signal representing a projected signal of the first period. This does not mean to say that in the device that signals from 0 to 200 yards could not be detected if sufficient band-pass filters and analyzers were used and variable frequency oscillators also provided. This merely means that echo signals received must be produced by a transmitted signal representing that same period.

It is readily apparent that if sufficient band-pass filters corresponding to band-pass filter 47 and sufficient analyzers corresponding to analyzer 48 were provided the entire spectrum from 60 to 110 kilocycles representing ranges from 0 to 200 yards could be analyzed and the VFO oscillator might be dispensed with. However, in this embodiment only one band-pass filter corresponding to 47 and only one 90 filter analyzer corresponding to analyzer 48 is utilized, therefore, to analyze the complete spectrum from 60 to 110 kilocycles, i.e., a 50 kilocycle swept band, it is necessary to provide the VFO 46 so that the range gate may be adjusted as desired.

The following table is provided which may be useful in further understanding the operation of the system of FIG. 5 wherein signals from 5 range bands are listed in the table as examples.

| FMO Output, kc. | Signal input to Mixer 37, kc. | Input to Mixer 45, kc. | VFO 46 Freq., kc. | Mixer No. 45 Output, kc. | Orig. Diff. Freq. Band Analyzed, kc. | Percent Lost Time Elim. | Percent Max. Range |
|---|---|---|---|---|---|---|---|
| 325-275 | 325-275 | 60-110 | 5 | 55-105 | 0-5 | 0-10 | 0-10 |
| --------- | --------- | --------- | 10 | 50-100 | 5-10 | 10-20 | 10-20 |
| --------- | --------- | --------- | 25 | 38-85 | 20-25 | 40-50 | 40-50 |
| --------- | --------- | --------- | 35 | 25-75 | 30-35 | 60-70 | 60-70 |
| --------- | --------- | --------- | 50 | 10-60 | 45-50 | 90-100 | 90-100 |

Figure 7:
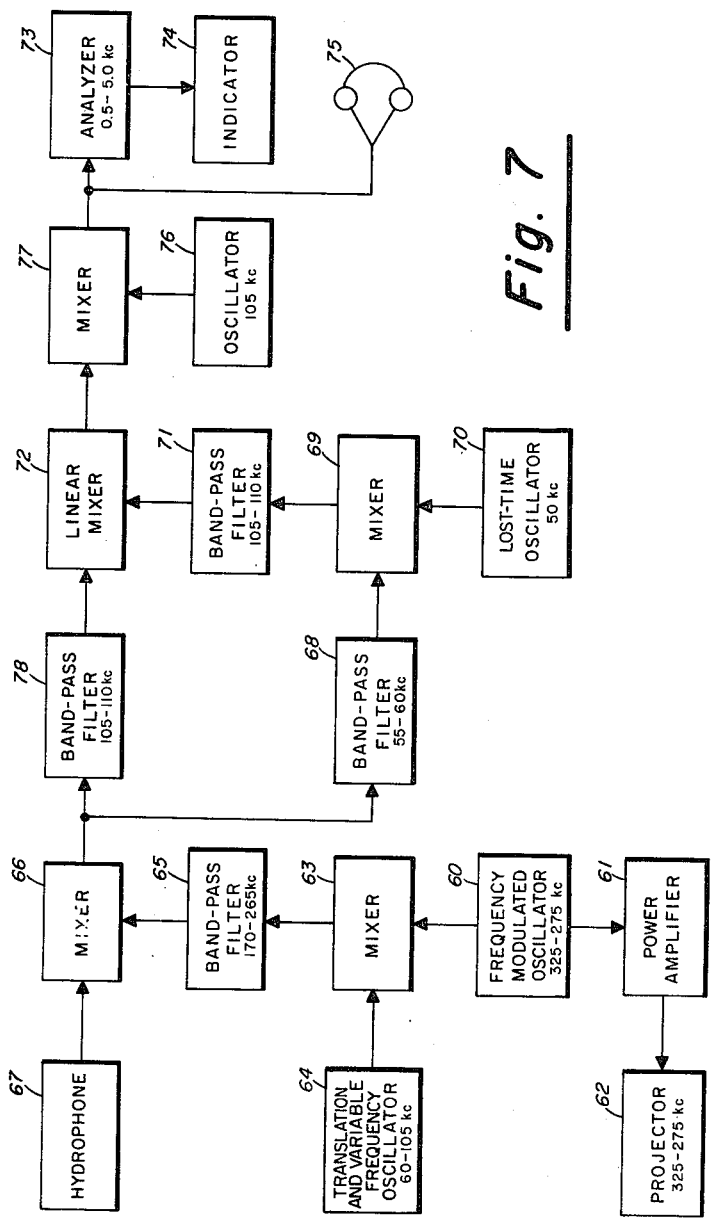
FIG. 7 is a block diagram of another embodiment of a high range resolution sonar system of the present invention.

FIG. 7 illustrates an alternative embodiment and method for obtaining high range resolution frequency modulated sonar and operates essentially the same as the embodiment of FIG. 5; except for the fact that the variable frequency oscillator used to establish the range gate is combined with the translation oscillator thereby eliminating one component in the system. In the operation of the device a frequency modulated oscillator 60 generates a band of frequencies ranging from 325 to 275 kc. which are amplified in a power amplifier 61 and propagated into the water through a projector 62. The output of the frequency modulated oscillator 60 forms one input to a mixer 63. The other input to mixer 63 is the output of a translation oscillator and VFO 64 used to establish the range gate which produces a range of frequencies from 60 to 105 kilocycles. The output of mixer 63, representing the difference frequencies between the inputs of 64 and 60 is introduced into a band-pass filter 65 which is designed to pass a range of frequencies from 170 to 265 kilocycles. The output of band-pass filter 65 is introduced into a nonlinear mixer 66 wherein the other input comprises the reflected signal received on hydrophone 67. The output of mixer 66 represents the difference frequency between the outputs of hydrophone 67 and band-pass filter 65 and is introduced into a band-pass filter 78 designed to pass a range of frequencies from 105 to 110 kilocycles. Thus, it is seen that at this point a 5 kilocycle range gate has been established which may be moved or varied in distance from the hydrophone or projector as desired by adjusting the output of translation oscillator and VFO 64.

One output of mixer 66 is introduced into a band-pass filter 68 which forms part of the system for eliminating signals corresponding to lost time. Band-pass filter 68 is designed to pass a range of frequencies from 55 to 60 kilocycles and the output of this filter forms one input to mixer 69 wherein the other input is the output from a lost time oscillator 70 designed to generate a frequency of 50 kilocycles. The output of mixer 69 represents the sum of input signals from band-pass filter 68 and lost time oscillator 70 and is introduced into a band-pass filter 71 designed to pass the range of frequencies from 105 to 110 kilocycles. The output from band-pass filter 71 is introduced into a linear mixer 72 wherein the other input comprises the output of band-pass filter 78. Thus at this point the signals corresponding to lost time frequencies are eliminated thereby eliminating lost time.

The output of linear mixer 72 may be introduced directly into an analyzer 73 which comprises 90 filters and analyzes a range of frequencies from 0.5 to 5 kilocycles. The output of the analyzer may then be displayed on an indicator 74 which may comprise an oscilloscope for visual display.

In that in this embodiment the range of frequencies examined is between 105 and 110 kilocycles, it is obvious that if an aural display on headphones 75 is desired a further retranslation downward in frequency is required. This is accomplished by feeding the output of retranslation oscillator 76 into a mixer 77 wherein the output of linear mixer 72 is heterodyned with the output of the retranslation oscillator 76 thereby producing a band of signals ranging from 0 to 5 kilocycles.

In this embodiment, in order to examine a range gate encompassing the range from 0 to 20 yards the translation oscillator would be set at 100 kilocycles which would produce a band of frequencies in the band-pass filter 78 of 105 to 110 kc. The operation of the system in every other respect is like that set forth in FIG. 6 and the same comparison and same discussion would apply thereto as to the elimination of lost time frequencies and the elimination of signals representing ambiguous objects in the medium.

Thus it is seen that for a particular frequency modulated sonar system having a given swept band and a given frequency spectrum analyzer, the present apparatus and method of operation results in a great increase in the range resolution. In addition, the method of frequency translation of the output of the frequency modulated oscillator previous to its being heterodyned against the reflected signals results in a rejection of unwanted signals incident to the operation of the system which would result in ambiguous targets being produced. Also, a further advantage of this system is that frequencies corresponding to lost time or round trip transmission time are eliminated thereby making it possible to utilize the entire band of difference frequencies. Further it is apparent that a large number of narrow filters in the analyzer is not required to achieve high range resolution due to the fact that a range gate is established which may be varied and results in being able to analyze any selected band of difference frequencies which is essentially the equivalent of magnifying a portion of the total band of ranges. It is also apparent that the entire band of difference frequencies corresponding to the width of the swept band may be analyzed simultaneously if the number of analyzers is multiplied.

Obviously many modifications and variations of the present invention are possible in the light of the above teachings. It is therefore to be understood that within the scope of the appended claims the invention may be practiced otherwise than as specifically described.

What is claimed is:

1. In a system for achieving high range resolution; means for propagating a frequency modulated periodically varying signal in a given medium varying in frequency between a first and second value; an oscillator for producing a frequency greater than the difference between the first and second values of the propagated signal; first mixer means for mixing the outputs of said propagating means and said oscillator to produce a translated frequency; means for receiving signals reflected from objects in the medium; second mixer means for mixing together said translated frequency and said received signals to produce output frequencies representative of range to objects in the medium; first filter means for passing signals representative of round trip transit time to objects in said medium; second oscillator means for generating a desired frequency; third mixer means for mixing the outputs of said second oscillator means and said first filter means for eliminating said signals representative of round trip transit time and producing signals representative of range to objects in the medium; second filter means for passing frequencies in the output of said second mixer means representing range to objects in the medium; and means for linearly mixing the output of said second filter means with the output of said third mixer representative of range to objects in said medium to produce output frequencies representing range to objects in said medium.

2. The system of claim 1 and further including a variable frequency oscillator for generating a desired frequency, and other means for mixing said desired frequency with said received signals to produce a narrow band of frequencies representing a narrow range gate at a desired distance from the propagating means.

3. The system of claim 2 and further including analyzing means for analyzing said narrow band of frequencies to determine range to objects in said medium.

4. The system of claim 1 and further including a variable frequency oscillator for generating a desired frequency for establishing a range gate wherein said variable frequency oscillator comprises said oscillator for producing a frequency greater than the difference between the first and second values of the propagated signal.

References Cited in the file of this patent

UNITED STATES PATENTS

| 2,853,705 | Marchand | Sept. 23, 1958 |
| 2,977,568 | Roshon et al. | Mar. 28, 1961 |
| 3,016,513 | Van Dyke | Jan. 9, 1962 |

FOREIGN PATENTS

| 676,032 | Great Britain | July 23, 1952 |